United States Patent
Miyoshi et al.

(10) Patent No.: US 7,133,698 B2
(45) Date of Patent: Nov. 7, 2006

(54) RADIO BASE STATION APPARATUS AND RADIO COMMUNICATION METHOD

(75) Inventors: Kenichi Miyoshi, Yokohama (JP); Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 270 days.

(21) Appl. No.: 10/069,396

(22) PCT Filed: Jun. 26, 2001

(86) PCT No.: PCT/JP01/05435

§ 371 (c)(1),
(2), (4) Date: Feb. 26, 2002

(87) PCT Pub. No.: WO02/01751

PCT Pub. Date: Jan. 3, 2002

(65) Prior Publication Data

US 2002/0123371 A1    Sep. 5, 2002

(30) Foreign Application Priority Data

Jun. 29, 2000    (JP)    .............................. 2000-197133

(51) Int. Cl.
*H04M 1/00*    (2006.01)

(52) U.S. Cl. ................ 455/562.1; 455/561; 455/277.2; 455/133; 455/135; 455/67.13

(58) Field of Classification Search ................ 455/561, 455/562.1, 25, 101, 63.4, 67.1, 67.13, 67.16, 455/504, 65, 132–139, 277.2, 278.1, 279.1, 455/16, 67.11; 342/357.1, 357.13, 13; 375/200, 375/208–210, 267, 347; 370/252–253, 465–467
See application file for complete search history.

(56) References Cited

U.S. PATENT DOCUMENTS 5,349,360 A    9/1994    Hiroyasu (Continued)

FOREIGN PATENT DOCUMENTS

JP    05259736    10/1993

(Continued)

OTHER PUBLICATIONS

International Search Report dated Sep. 18, 2001.

(Continued)

*Primary Examiner*—Matthew D. Anderson
*Assistant Examiner*—Tuan Tran
(74) *Attorney, Agent, or Firm*—Stevens, Davis, Miller & Mosher, LLP

(57) ABSTRACT

The fading correlation monitor 103 detects an angle spread of the communication terminal apparatus 200-1 and decides whether the angle spread has a larger or smaller relationship with a preset threshold value. When the estimated angle spread is smaller than the threshold value, the interference wave is suppressed by carrying out directive reception which is carried out by an AAA receiver 106 as well as performing directive transmission which is carried out in a transmitting circuit 122. While, when the estimated angle spread is larger than the predetermined value, the distortion of the signals due to the fading is compensated by carrying out diversity receiving which is carried out in a diversity receiver 107 as well as performing diversity transmission which is carried out in a diversity transmitter 123. On account of this, even when the fading correlation is small, it is possible to carry out a radio communication with a satisfactory communication quality.

9 Claims, 9 Drawing Sheets

U.S. PATENT DOCUMENTS

| | | | |
|---|---|---|---|
| 5,561,850 A * | 10/1996 | Makitalo et al. | 455/506 |
| 5,621,752 A * | 4/1997 | Antonio et al. | 375/144 |
| 5,710,995 A * | 1/1998 | Akaiwa et al. | 455/277.2 |
| 5,960,330 A * | 9/1999 | Azuma | 455/70 |
| 5,960,336 A * | 9/1999 | Ikawa et al. | 455/277.2 |
| 6,167,286 A * | 12/2000 | Ward et al. | 455/562.1 |
| 6,229,486 B1 * | 5/2001 | Krile | 343/700 MS |
| 6,347,234 B1 * | 2/2002 | Scherzer | 455/562.1 |
| 6,385,181 B1 * | 5/2002 | Tsutsui et al. | 370/335 |
| 6,442,405 B1 | 8/2002 | Hiramatsu et al. | |
| 6,477,213 B1 * | 11/2002 | Miyoshi et al. | 375/347 |
| 6,498,591 B1 * | 12/2002 | Yokogi | 343/893 |
| 6,498,804 B1 * | 12/2002 | Ide et al. | 375/144 |
| 6,603,961 B1 * | 8/2003 | Kuroda | 455/133 |
| 6,622,013 B1 * | 9/2003 | Miyoshi et al. | 455/277.2 |
| 6,763,062 B1 * | 7/2004 | Kohno et al. | 375/220 |

FOREIGN PATENT DOCUMENTS

| | | |
|---|---|---|
| JP | 10056420 | 2/1998 |
| JP | 10163938 | 6/1998 |
| JP | 2000022612 | 1/2000 |
| JP | 2000115190 | 4/2000 |
| WO | 9957574 | 11/1999 |

OTHER PUBLICATIONS

Japanese Office Action dated Mar. 30, 2004 with English translation.

* cited by examiner

RADIO BASE STATION APPARATUS AND RADIO COMMUNICATION METHOD

TECHNICAL FIELD

The present invention relates to a radio base station apparatus and a radio communication method for directional transmission and reception.

BACKGROUND ART

In digital radio communication, adaptive array antenna (hereinafter, referred to as "AAA") technology which adaptively controls the directivity of a plurality of antenna elements by adding weight to the antenna output is used. In the AAA technology, it is possible to suppress the interfering waves by adaptively controlling the directivity utilizing the fact that the directions of arrival of signals are different from each other. Accordingly, the AAA technology is preferred as a method for suppressing the interfering waves.

Referring to FIG. 1, the formation of directivity pattern in a radio base station apparatus which utilizes the AAA technology will be described. FIG. 1 is a diagram showing a transmitted radio wave which is transmitted from a communication terminal apparatus arrives at a radio base station apparatus provided by two antenna elements.

The radio wave transmitted from communication terminal apparatus is received by radio base station apparatus via its respective antenna elements 31 and 32. In this case, the received radio wave 34 which is received by the antenna element 32 introduces a larger phase rotation compared with the received radio wave 33 which is received by the antenna element 31, since the former travels through path difference L longer than that of the latter.

The radio base station apparatus monitors and measures the difference between the phase rotation of the received radio wave 33 and the phase rotation of the received radio wave 34 (difference in phase rotation). Since the difference in phase rotation and the direction of arrival of the received radio wave always related to each other when the fading correlation is high, the radio base station apparatus estimates the direction of arrival of the received radio wave based on the measured difference in phase rotation, and generates a directivity pattern for suppressing the multi-path and other users interference.

However, when the fading correlation between the received radio wave 33 and the received radio wave 34 is small and therefore the fading itself to which the received radio wave 33 and the received radio wave 34 are subjected to in the respective paths is different, the difference in phase rotation measured by the radio base station apparatus includes not only the difference due to the difference in the travelling paths but also the difference due to the difference of the fading itself. Consequently, when the fading correlation is small, the difference in phase rotation measured by the radio base station apparatus and the direction of arrival of the received radio wave do not always related to each other. Thus, since the direction of arrival (direction of angle . in FIG. 1) of the received radio wave can not be estimated correctly when the fading correlation is small, there exists a problem that desired directivity can not be correctly generated leading to deterioration of the communication quality.

DISCLOSURE OF INVENTION

An object of the present invention is to provide a radio base station apparatus and a radio communication method capable of carrying out radio communication with a satisfactory communication quality even when the fading correlation is small.

This object can be achieved by carrying out diversity transmission and reception without generating the directivity so that the distortion of the signal due to fading is compensated and the communication quality is improved even when the fading correlation of the respective received waves is small.

BEST MODE FOR CARRYING OUT THE INVENTION

When the fading correlation is small and the fading environments of a plurality of antennas are different, then performance deterioration due to the fading can be reduced by carrying out transmission using an antenna that is capable of performing transmission of signals under a slight distortion of the signals caused by fading. Accordingly, in the case of small fading correlation, diversity technologies are preferred. In these diversity technologies, the diversity receiving technology is an art that compensates the distortion of the signals caused by fading, at the receiving side, the uncorrelated received signals of a plurality of branches are appropriately combined. On the other hand, the diversity transmission technology is an art that compensates in advance, the distortion of the signals caused by fading before transmitting the signals by appropriately combining the transmission signals of a plurality of branches at the transmitting side.

While, when the fading correlation is high and therefore the direction of arrival can be estimated correctly, it is possible to remove the interference between communicating parties of which direction of arrival is different by means of directive transmission and directive reception. However, to improve the communication quality in case of a high fading correlation, the AAA technology is preferred.

While considering the performing of a satisfactory radio communication as a main point, it is essential of the present invention to suppress the interference wave by carrying out directional transmission/reception when a monitored fading correlation is larger than a predetermined threshold value, and to compensate the distortion of the signals due to fading by carrying out diversity transmission/reception when the fading correlation is smaller than a predetermined threshold value.

Referring to the attached drawings, a detail description of the embodiments of the present invention is given below.

(First Embodiment)

In a first embodiment, the case when the fading correlation is detected by monitoring the angle spread will be explained while directing the viewpoint to the fact that the larger the angle spread is the smaller fading correlation. That is to say, in order to carry out radio communication with a satisfactory communication quality, the base station apparatus according to the first embodiment estimates the angle spread based on the received signal, and when the estimated angle spread is smaller than a predetermined threshold value, it carries out the AAA transmission and reception to suppress the interference wave while carrying out diversity transmission and reception to compensate the deterioration of the signal when the angle spread is larger than a predetermined threshold value.

Figure 1:
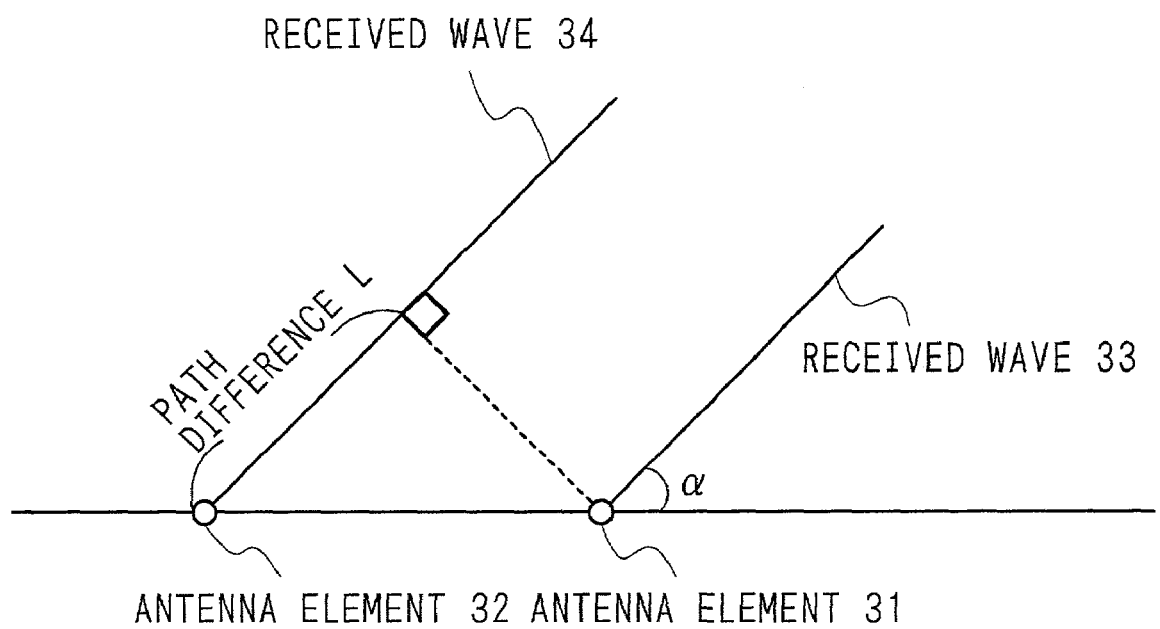
FIG. 1 is a diagram showing a transmitted radio wave which is transmitted from a communication terminal apparatus arrives at a radio base station apparatus provided by two antenna elements.
Figure 2:
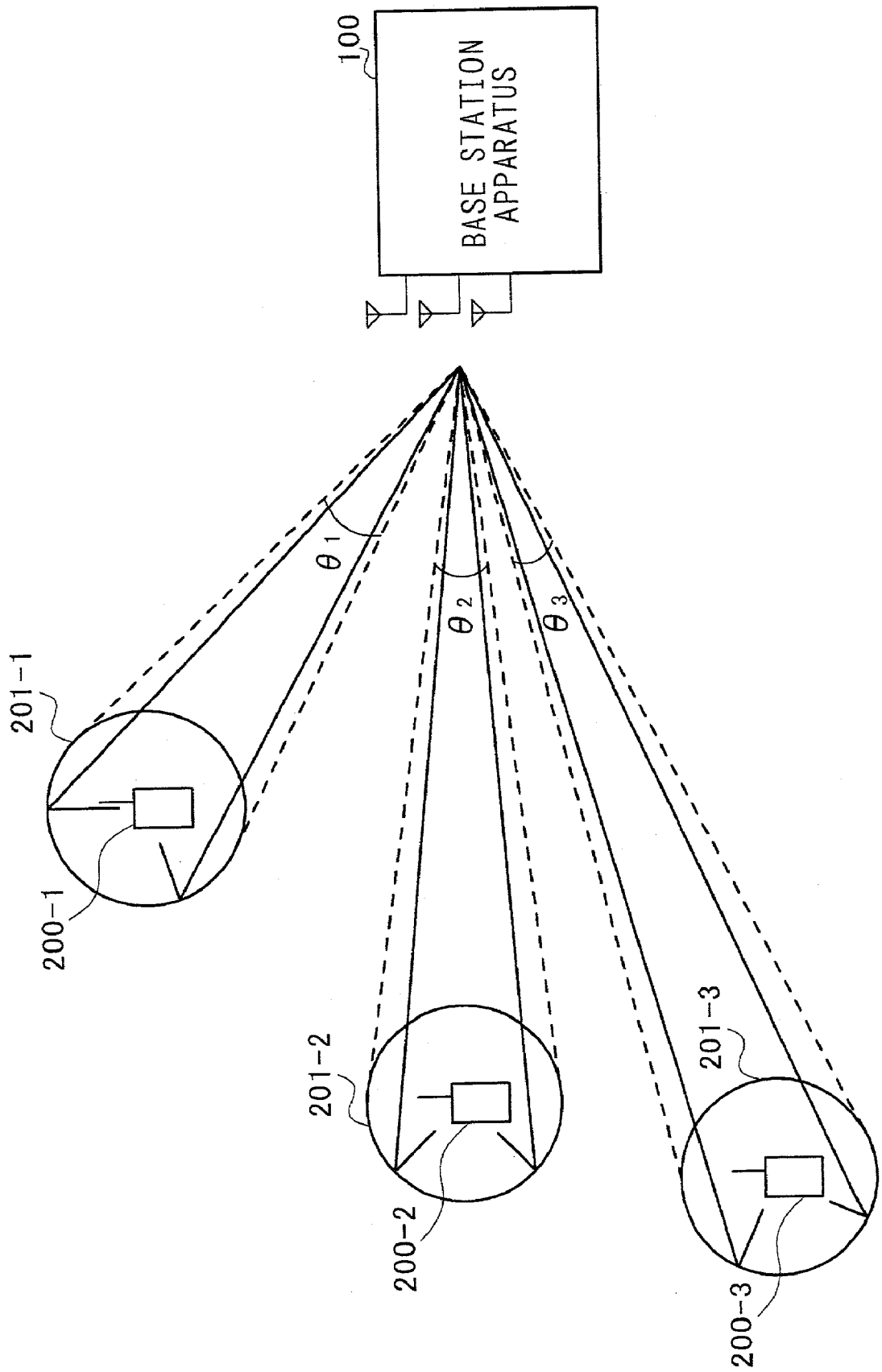
FIG. 2 is a diagram illustrating a base station apparatus according to a first embodiment of the present invention.

FIG. 2 is a diagram illustrating a base station apparatus according to the first embodiment of the present invention.

The radio wave transmitted from the radio base station apparatus 100 is scattered by the obstacles such as buildings etc surrounding the communication terminal apparatuses 200-1 to 200-3 which in turn intended to receive the scattered signal. Moreover, the radio waves transmitted from the communication terminal apparatuses 200-1 to 200-3 are scattered by the same surrounding obstacles as the reception case and are received by the radio base station apparatus 100. Herein, the scattering circles 201-1 to 201-3 denote imaginary circles drawn around the respective communication terminal apparatuses 200-1 to 200-3 to represent the location where the obstacles which scatter the transmitted/received radio wave of the communication terminal apparatuses 200-1 to 200-3 exist. Further, 0.1 to 0.3 denote, respectively, the angle spread obtained by drawing two tangent lines from the radio base station apparatus 100 to the respective scattering circles 201-1 to 201-3.

Figure 3:
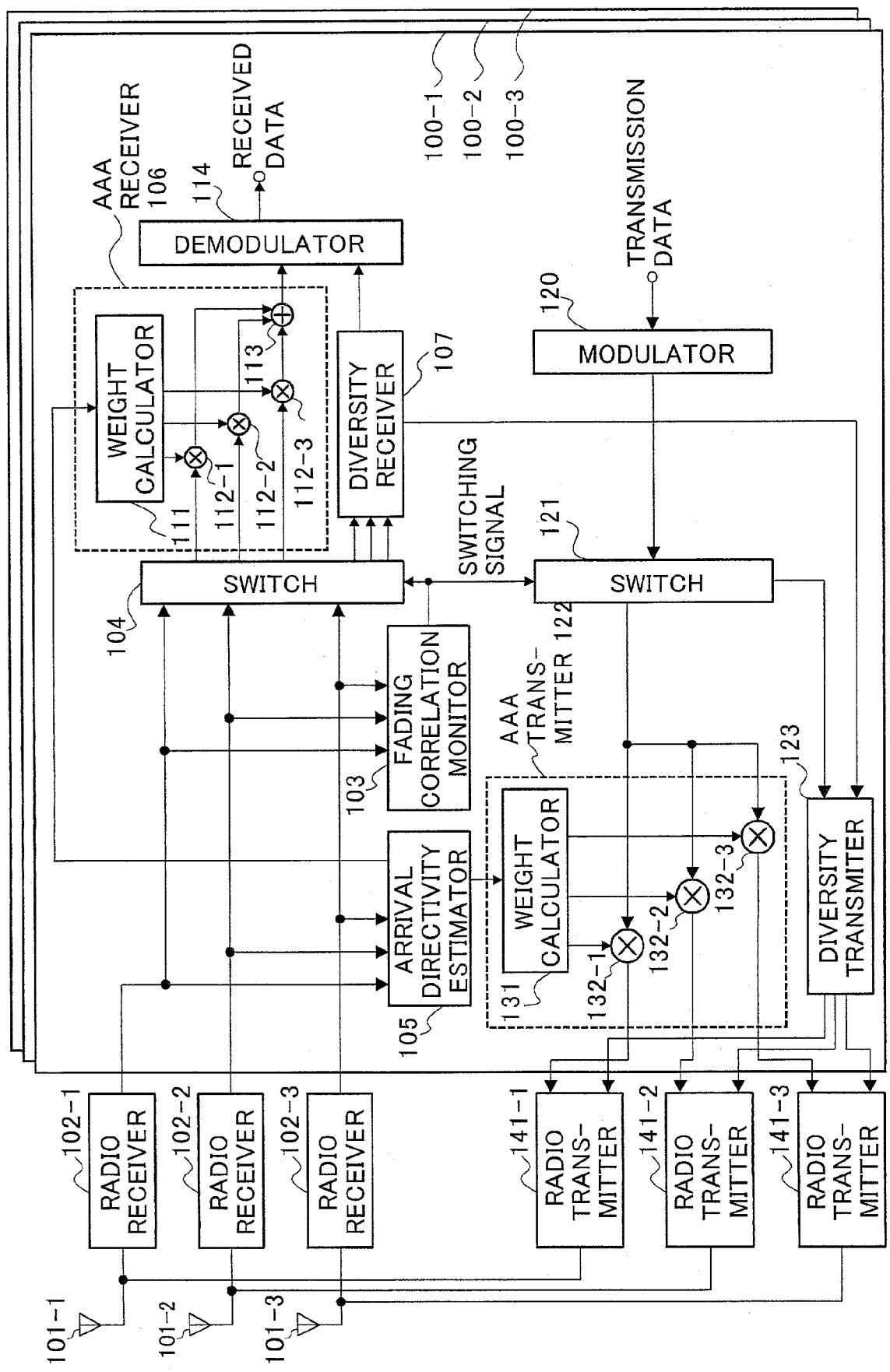
FIG. 3 is a block diagram illustrating the base station apparatus configuration according to the first embodiment of the present invention.

FIG. 3 is a block diagram illustrating the configuration of the base station apparatus 100.

The base station apparatus 100 has transmitting/receiving circuits 100-1 to 100-3 corresponding to the respective communication terminal apparatuses 200-1 to 200-3. The transmitting/receiving circuit 100-1 includes a fading correlation monitor 103, a switch 104, an arrival directivity estimator 105, an AAA receiver 106, a diversity receiver 107, a demodulator 114, a modulator 120, a switch 121, an AAA transmitter 122 and a diversity transmitter 123. Since the transmitting/receiving circuits 100-1 to 100-3 have the same configuration, the description will be restricted only to the transmitting/receiving circuit 100-1 as an example, and the description of the transmitting/receiving circuits 100-2 to 100-3 will be omitted.

The radio receivers 102-1 to 102-3 carry out a (predetermined) known or a normal radio reception processing such as down-conversion, etc., on the signals received by the corresponding antennas 101-1 to 101-3, and output the received signals which have been radio reception processed to fading correlation monitor 103, switch 104 and arrival directivity estimator 105.

The fading correlation monitor 103 detects the angle spread 0.1 of the communication terminal apparatus 200-1 based on the received signal, takes a decision on the angle spread whether it is larger or smaller than a preset threshold value, and outputs a switching signal that indicates the decision result to both switch 104 and switch 121. Hereinafter, the decision on large/small relationship relative to the preset threshold value will be referred to as "threshold value decision".

The switch 104 outputs the signals received from the radio receivers to either the AAA receiver 106 or to the diversity receiver 107 according to the switching signal. The arrival directivity estimator 105 estimates the direction of arrival of the received signals and outputs the result of estimation to the AAA receiver 106 provided by weight calculator 111 and to AAA transmitter 122 provided by weight calculator 131.

When the received signals are outputted from the switch 104, the AAA receiver 106 calculates the weights based on the result of the estimation of direction of arrival in the arrival directivity estimator 105 so as to suppress the interference wave in the uplink, and weights the received signals of the respective branches with the respective calculated weights. In the AAA receiver 106, the weight calculator 111 decides the weight by which each received signal branch is multiplied based on the result of estimation of the direction of arrival. The multipliers 112-1 to 112-3 multiply the received signal of the respective branch by its respective weight calculated in the weight calculator 111. The adder 113 captures and adds up the multiplication results received from the multipliers 112-1 to 112-3 and outputs the added result to the demodulator 114.

When the received signals are outputted from the switch 104, the diversity receiver 107 processes the received signal of the respective branches with the maximal-ratio combining to compensate the distortion of the received signal due to the fading in the uplink. The maximal-ratio combining technique is a combing technique by which the received signals of the respective branches which have been weighted proportionally to the received power and inverse proportionally to the noises are added constructively. Further, the diversity receiver 107 may use the equal-gain combining technique in which the received signals of respective branches are added directly without being weighted, or it may use the selection combining technique in which the received signal that has the maximum estimated received power among all of the received signals of the respective branches is selected, etc.

The demodulator 114 demodulates the output of the AAA receiver 106 or the output of the diversity receiver 107 with a predetermined demodulating mode such as QPSK, etc., and obtains the received data.

The modulator 120 modulates the transmission data with a predetermined modulating mode, and outputs the modulated signal to the switch 121. The switch 121 outputs the transmission signal outputted from the modulator 120 to either the AAA transmitter 122 or to the diversity transmitter 123 based on the switching signal outputted from the fading correlation monitor 103.

When a transmission signal is outputted from the switch 121, the AAA transmitter 122 calculates the weights based on the result of the estimation of the direction of arrival estimated in arrival directivity estimator 105 so as to suppress the interference wave in the downlink, and weights the transmission signals of the respective branches with the calculated weights. In AAA transmitter 122, the weight calculator 131 decides the weight by which each received signal is multiplied based on the result of the estimation. The multipliers 132-1 to 132-3 multiply the transmission signals of the respective branches by their respective weights calculated in the weight calculator 131.

When the transmission signal is outputted from the switch 121, the diversity transmitter 123 carries out the maximal-ratio combining on the transmission signals of the respective branches referring to the weighting in the diversity receiver 107 to previously compensate the distortion of the transmission signal due to the fading in the downlink (maximal-ratio diversity transmission). Further, the diversity transmitter 123 may use selective diversity transmission which selects only the received signal that has the maximum estimated received power depending on the combining mode in the diversity receiver 107, or may use closed loop type (feed back type) diversity transmission that selects the weighting of the transmission signal or transmission antenna according to information received from the mobile station (feed back information), etc.

The radio transmitters 141-1 to 141-3 carry out a predetermined radio transmission processing on the transmission signals outputted from the corresponding multipliers 132-1 to 132-3 or the diversity transmitter 123, and transmit the radio processed signals via the corresponding antennas 101-1 to 101-3.

The directive reception and directive transmission carried out in the foregoing AAA receiver 106 and AAA transmitter 122, respectively, are preferable when the fading correlation of the respective branches of the received signals is large, while the diversity reception and diversity transmission carried out in the diversity receiver 107 and diversity transmitter 123, respectively, are preferable when the fading correlation of the respective branches of the received signals is small.

Figure 4:
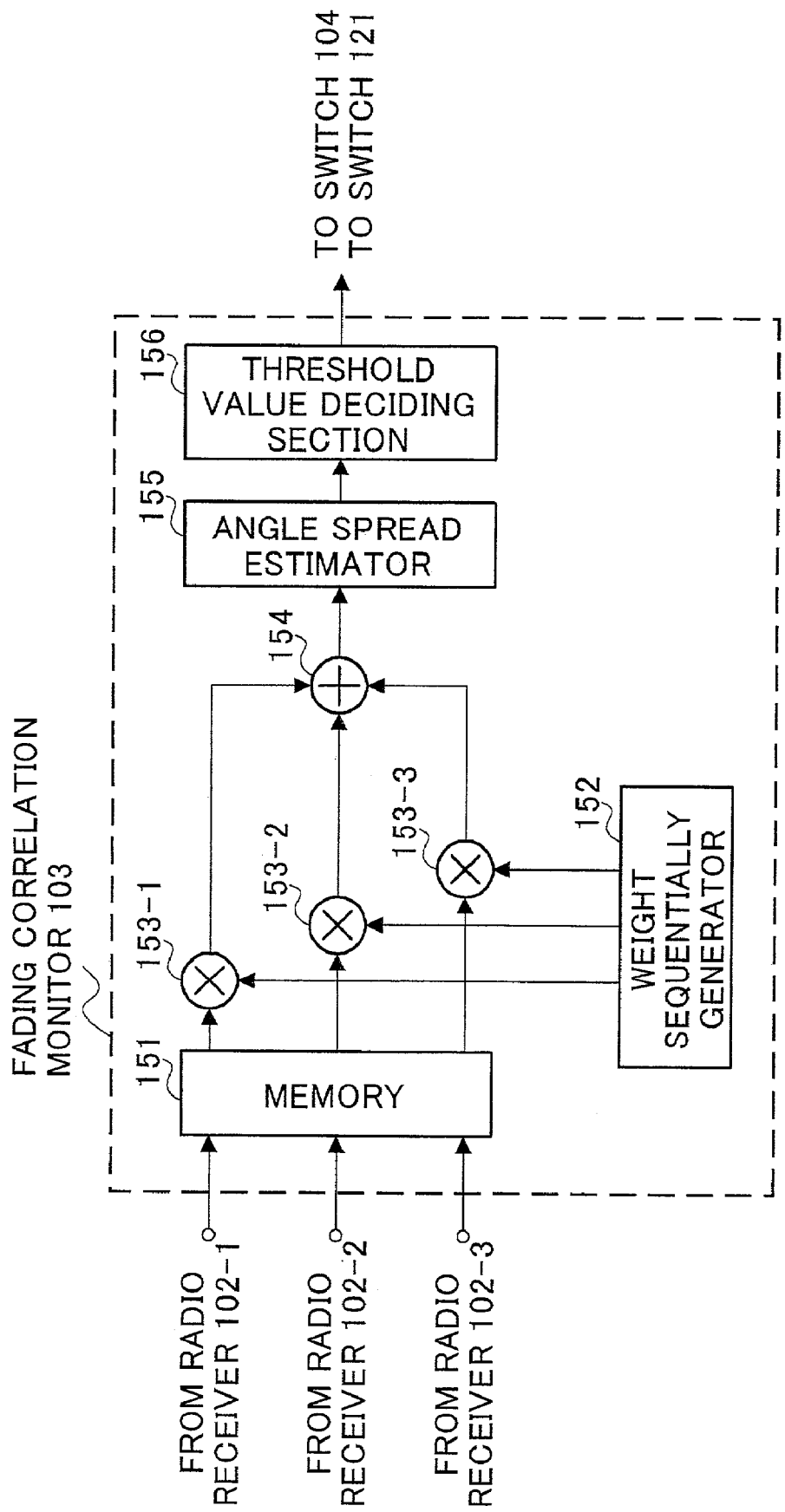
FIG. 4 is a block diagram illustrating the configuration of a fading correlation monitor according to the first embodiment of the present invention.

FIG. 4 is a block diagram illustrating the configuration of a fading correlation monitor 103 according to the first embodiment of the present invention.

The memory 151 memorizes the received signals outputted from the radio receivers 102-1 to 102-3, and outputs the memorized received signals to the multipliers 153-1 to 153-3 of the corresponding branch every time when the weight sequentially generator 152 outputs the weight. The memory 151 memorizes the received signals until the switching signal corresponding to the received signals is generated in the threshold value deciding section 156. The weight sequentially generator 152 generates the weights that can produce a directivity pattern of 0°–360° in 1° increment, and outputs the weights to the multipliers 153-1 to 153-3. The multipliers 153-1 to 153-3 multiplies the received signals of the respective branches which are output from the memory 151 by the weights outputted from the weight sequentially generator 152, and outputs the multiplication result to the adder 154. The adder 154 adds up the outputs of the multipliers 153-1 to 153-3 and outputs the resultant to the angle spread estimator 155. The angle spread estimator 155 which outputs a 1° increment directivity pattern measures the resultant corresponding output power of the adder 154, and estimates the angle spread based on the measurement result. The threshold value deciding section 156 carries out threshold value decision process on the angle spread estimated in the angle spread estimator 155, and outputs the switching signal that represents the decision result to both switch 104 and switch 121.

An operational explanation of the base station apparatus 100 configured as described above is given below.

The radio waves transmitted from the communication terminal apparatuses 200-1 to 200-3 are scattered by the obstacles existing on the periphery of the corresponding scattering circles 201-1 to 201-3, and are received by the radio base station apparatus 100.

In the base station apparatus 100, the signals transmitted from the communication terminal apparatuses 200-1 to 200-3 are received via antennas 101-1 to 101-3. The received signals are subjected to a predetermined radio reception processing operation and are output to fading correlation monitor 103, switch 104 and arrival directivity estimator 105.

Now, an operational description of the fading correlation monitor 103 is given below.

In the fading correlation monitor 103, the angle spread of the partner communication terminal apparatus is estimated based on the received signal of the respective branches, the estimated angle spread is subjected to threshold value decision process, then a switching signal is generated to indicate either the AAA receiver 106 or the diversity receiver 107 is to process the received signal.

The received signals of the respective branches which have been processed by a predetermined radio reception processing in the radio receivers 102-1 to 102-3 are memorized in the memory 151, and are outputted from the memory 151 to the corresponding multipliers 153-1 to 153-3 synchronizing to the output timing of the weight sequentially generator 152. The received signals of the respective branches memorized in the memory 151 are multiplied by the weights corresponding to the directivity pattern of 0°–360°, which are outputted from the weight sequentially generator 152 in 1° increment, added to each other and outputted to the angle spread estimator 155. That is to say, the received power being formed with the directivity of 0°–360° is outputted to the angle spread estimator 155.

In the angle spread estimator 155, the received signals weighted so as to form the directivity of 0°–360° and outputted from the adder 154, are measured in 1° (precision) increment, and the measured powers are subjected to threshold value decision process. This threshold value decision process is carried out to measure the angle spread of the partner communication terminal apparatuses 200-1 to 200-3. When the measured power is larger than a threshold value which means that the received radio wave comes from that direction what "that direction", then, it is decided that a scattering circle exists in that direction. On the contrary, when the measured power is smaller than the threshold value which means that the received radio wave does not come from that direction what "that direction", then, it is decided that a scattering circle does not exist in that direction. Further, the estimation method of the angle spread is not limited to this, and it is changeable depending on the system.

Figure 5:
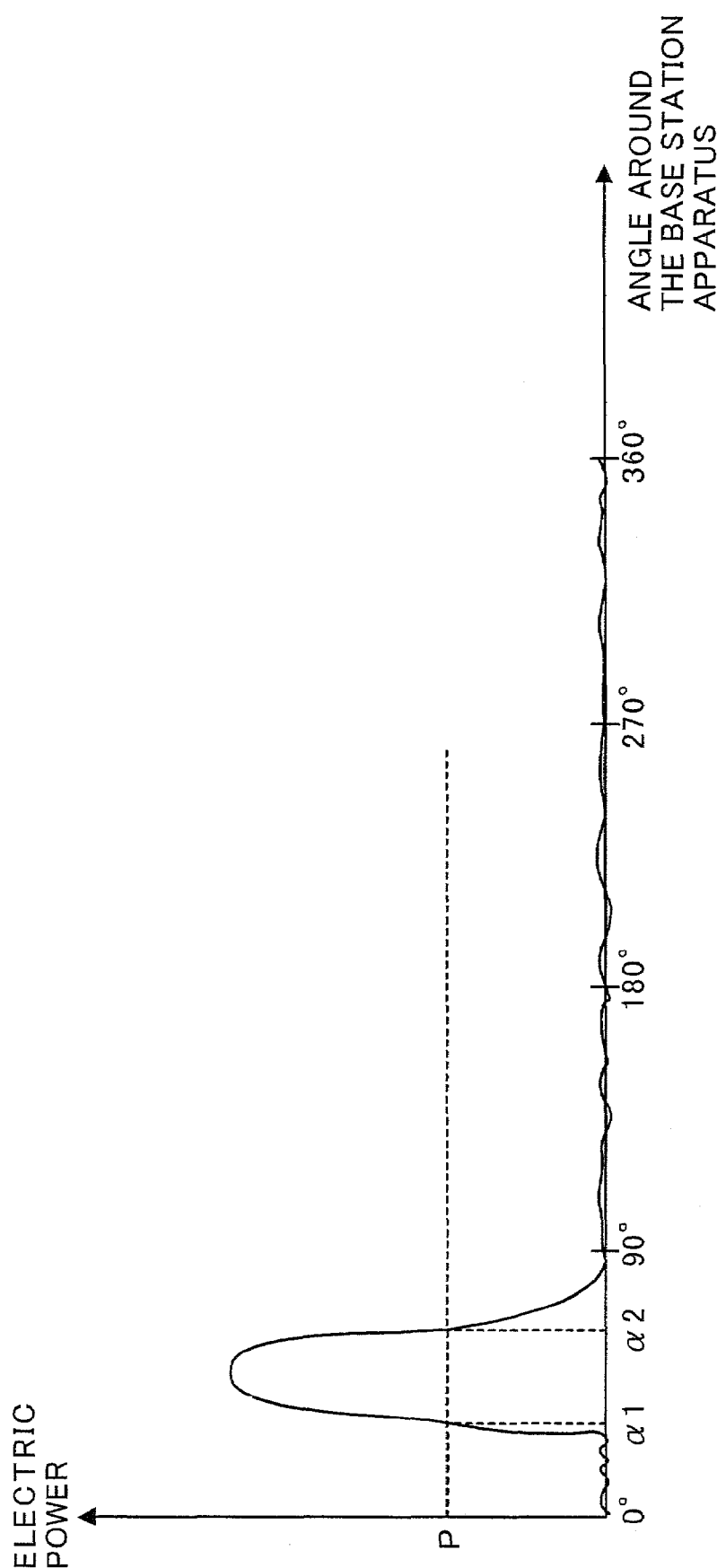
FIG. 5 is a diagram showing an example of an adder output according to the first embodiment of the present invention.

FIG. 5 shows an example of the addition results measurement which is outputted from the adder 154.

As shown in the figure, since the measured power is larger than the threshold value, (p), between 0.1 and 0.2, then, it is decided that a scattering circle exists between 0.1 and 0.2. The absolute range |0.1-0.2| where it is decided that the scattering circle exists is estimated as the angle spread. The estimated angle spread |0.1-0.2| is outputted to the threshold value deciding section 156.

In the threshold value deciding section 156, a threshold value has been set previously and the angle spread which is estimated in the angle spread estimator 155 is subjected to threshold value decision process utilizing the previously set threshold value. While taking into consideration the fact that the larger the angle spread is the smaller fading correlation, then, the threshold value decision process is carried out in order to decide either AAA receiver 106 or diversity receiver 107 is to process the received signal, and accordingly, to decide either AAA transmitter 122 or diversity transmitter 123 is to process the transmission signal. In other words, when the estimated angle spread is smaller than the threshold value which means that the fading correlation is large then, it is decided that the received signal and the transmission signal are to be processed, respectively, by the AAA receiver 106 and the AAA transmitter 122. On the contrary, when the estimated angle spread is larger than the threshold value, then it is decided that the received signal and the transmission signal are to be processed, respectively, by the diversity receiver 107, and the diversity transmitter 123. By this way of carrying out the threshold value decision process, a switching signal that represents the result of the threshold value decision process is generated. The generated switching signal is output to the switch 104 and switch 121. The threshold value is appropriately set in the system taking into consideration the location of the obstacles that scatters the received radio wave, the algorithm for calculating the weight, etc.

In the switch 104, the received signal is outputted to either AAA receiver 106 or diversity receiver 107 according to the switching signal outputted from the fading correlation monitor 103. The received signals of the respective branches outputted to the AAA receiver 106 are multiplied by the respective weights so as to suppress the interference wave, and are demodulated in the demodulator 114 resulting in the received data. Whereas the received signals of the respective branches outputted to the diversity receiver 107, are processed with maximal-ratio combining so that the distortion due to the fading is compensated, and are demodulated in the demodulator 114 resulting in the received data.

On the other hand, in the switch 121, the transmission signal, which has been modulated in the modulator 120, is outputted to either AAA transmitter 122 or diversity transmitter 123 according to the switching signal outputted from the fading correlation monitor 103 The transmission signals outputted to the AAA transmitter 122, are multiplied by the respective weights so as to suppress the interference in the downlink, and are processed with a predetermined radio transmission processing such as up-conversion, etc., in the radio transmitters 141-1 to 141-3, and are transmitted via antennas 101-1 to 101-3. The transmission signals of the respective branches outputted to the diversity transmitter 123, are maximal-ratio combining processed so as to compensate the distortion due to the fading in the downlink, subjected to radio transmission processing such as up-conversion in the radio transmitters 141-1 to 141-3, and are transmitted via antennas 101-1 to 101-3.

Thus, according to the first embodiment, the angle spread is estimated based on the received signal, and when the estimated angle spread is smaller than a predetermined threshold value, the interference wave is suppressed by carrying out the AAA transmission and reception and when the angle spread is larger than the threshold value, the distortion of the signal due to the fading is compensated by carrying out the diversity transmission and reception, therefore, it is possible to carry out a radio communication with a satisfactory (may be sufficient) communication quality.

Further, according to the first embodiment, since the scattering radiuses are roughly of the same size, it is understood that the larger the angle spread is the smaller distance between the base station apparatus and the communication terminal apparatus. Accordingly, when the angle spread is larger than the predetermined threshold value, the diversity transmission and reception is carried out and the transmitting power is reduced to a low level. On account of this, the influence of the interference on the other stations can be reduced without using any adaptive array antenna.

Furthermore, according to the first embodiment, when the received signal is processed in the diversity receiver 107 under the control of the switch 104, the arrival directivity estimator 105 does not have to carry out estimation of the direction of arrival. Therefore, the power consumption can be reduced.

(Second Embodiment)

The base station apparatus according to a second embodiment calculates a fading correlation value among the respective antenna elements, and when the calculated fading correlation value is larger than a predetermined threshold value, the interference wave is suppressed by carrying out the AAA transmission and reception while carrying out the diversity transmission and reception to compensate the distortion due to fading when the calculated fading correlation value is smaller than the threshold value, and hence, a radio communication with a satisfactory communication quality is carried out. That is to say, the second embodiment is different from the first embodiment in the point that the fading correlation among the respective antenna elements is monitored by calculating the fading correlation value itself.

Figure 6:
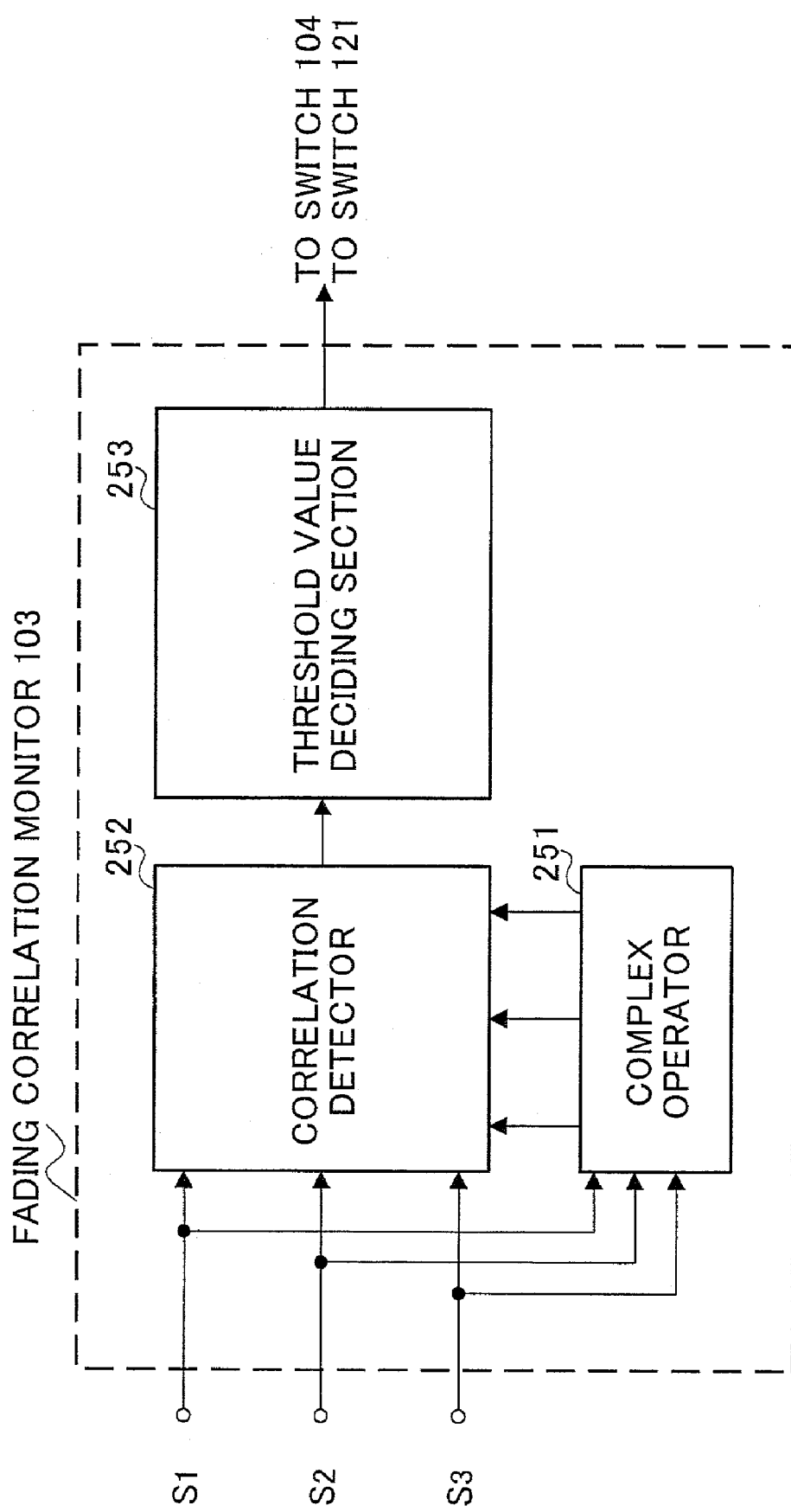
FIG. 6 is a block diagram illustrating the configuration of a fading correlation monitor according to a second embodiment of the present invention.

FIG. 6 is a block diagram illustrating the configuration of a fading correlation monitor 103 according to the second embodiment of the present invention. Next, the base station apparatus according to the second embodiment will be described referring to the FIG. 6. Further, according to the second embodiment, since the configuration of the base station apparatus excluding the fading correlation monitor 103 is the same as that of the base station apparatus according to the first embodiment, the detailed description will be omitted.

The complex operator 251 obtains a complex conjugates of S1, S2 and S3, which are the received signals of the respective branches outputted from the radio receivers 102-1 to 102-3, and outputs the obtained complex conjugates to the correlation detector 252. S1, S2, and S3, are the received signals outputted from the radio receivers 102-1, 102-2, and 102-3, respectively. Furthermore, the complex conjugate of S1, S2, and S3, are designated, respectively, as S1*, S2* and S3*.

In the correlation detector 252, the fading correlation value is calculated using the complex conjugates S1*, S2* and S3* of the received signals of the respective branches outputted from the complex operator 251 and the received signals S1, S2 and S3 of the respective branches. That is to say, the correlation value of the received signals S1 and S2 is S1×S2*, the correlation value of the received signals S1 and S3 is S1×S3* and the correlation value of the received signals S2 and S3 is S2×S3*, then, all correlation values are added up to obtain the fading correlation value. The correlation detector 252 outputs the fading correlation value calculated in this manner to the threshold value deciding section 253.

The threshold value deciding section 253 carries out threshold value decision process on the fading correlation value outputted from the correlation detector 252, and outputs a switching signal which represents the decision result to the switch 104 and the switch 121.

Now, an operational description of the base station apparatus 100 configured as described above is given below.

The received signals, which have been received from the antennas 101-1 to 101-3, are subjected to a predetermined radio reception processing in the radio receivers 102-1 to 102-3, and outputted to the fading correlation monitor 103, the switch 104 and the arrival direction estimator 105. In the fading correlation monitor 103, the calculated fading correlation value is subjected to the threshold value decision process, and accordingly a switching signal is generated.

An operational description of the fading correlation monitor 103 is given below.

In the fading correlation monitor 103, the fading correlation value among the respective antenna elements is calculated based on the received signals of the respective branches, the calculated fading correlation value is subjected to threshold value decision process, and corresponding to the result of the decision process, a switching signal is generated to indicate either AAA receiver 106 or diversity receiver 107 is to process the received signal.

The received signals S1, S2 and S3 of the respective branches are outputted to the complex operator 251 and the correlation detector 252. In the complex operator 251, the complex conjugates S1*, S2* and S3* of the received signals of the respective branches are obtained. The S1*, S2* and S3* are outputted to the correlation detector 252 and multiplied by the received signals S1, S2 and S3, then the multiplication results are added together to produce the fading correlation value.

The fading correlation value is then subjected to the threshold value decision operation in the threshold value deciding section 253. The threshold value decision operation is carried out corresponding to the fading correlation value in order to take a decision on the received signals that should be processed by either AAA receiver 106 or diversity receiver 107 moreover, to decide that either AAA transmitter 122 or diversity transmitter 123 should process the transmission signal. In other words, when the fading correlation value obtained by the correlation detector 252 is larger than a threshold value, it is determined that the received signals are processed by the AAA receiver 106 and the transmission signals are processed by the AAA transmitter 122. On the contrary, when the fading correlation value is smaller than the threshold value, it is decided that the received signals are processed by the diversity receiver 107 and the transmission signals are processed by the diversity transmitter 123.

Furthermore, the switching signal which represents the result of the threshold value decision process is generated and outputted to the switch 104 and the switch 121. The threshold value is appropriately set in the system taking into account the location of the obstacles that scatters the received radio wave, the algorithm for calculating the weight, etc.

Thus, according to the second embodiment, the fading correlation value is calculated based on the received signals, and when the calculated fading correlation value is smaller than a predetermined threshold value, the interference wave is suppressed by carrying out the AAA transmission and reception, and when the angle spread is larger than the predetermined threshold value, the distortion of the signal due to the fading is compensated by carrying out the diversity transmission and reception, and hence, a radio communication with a satisfactory communication quality can be carried out.

Further, in the second embodiment, it is understood that the smaller the fading correlation value is the smaller distance between the base station apparatus and communication terminal apparatus. Accordingly, when the fading correlation value is smaller than a predetermined threshold value, the diversity transmission and reception is carried out, and the transmitting power can be suppressed to a lower level. On account of this, the influence of interference on the other stations can be reduced without using any adaptive array antenna.

(Third Embodiment)

Examples in which the AAA transmission/reception and the diversity transmission/reception are switched over according to the distance between the base station apparatus and a communication terminal apparatus are given in third, fourth and fifth embodiments. That is to say, in the third embodiment, while taking into consideration the fact that the distance between the base station apparatus and the communication terminal apparatus can be estimated in accordance with the electric power of the received signal, the AAA transmission/reception and the diversity transmission/reception are switched over according to the received power. In the fourth embodiment, while taking into consideration the fact that the distance between the base station apparatus and communication terminal apparatus can be estimated according to the time lag (difference in timing) between the receiving timing of the received signal and the transmitting timing of the transmission signal, the AAA transmission/reception and the diversity transmission/reception are switched over there between. In the fifth embodiment, however, tacking into consideration the fact that the distance between the base station apparatus and the communication terminal apparatus can be estimated according to the number of the TPC information bits, the AAA transmission/reception and the diversity transmission/reception are switched over there between.

The base station apparatus according to the third embodiment estimates the distance between its own apparatus and the partner communication terminal apparatus based on the received power of the received signal, and when the estimated distance is larger than a predetermined threshold value, it carries out the AAA transmission and reception to suppress the interference wave, while, carrying out the diversity transmission and reception to compensate the distortion of the signal due to the fading when the estimated distance is smaller than the predetermined threshold value. That is to say, the third embodiment is different from the first embodiment in the point that the fading correlation between the respective antenna elements is monitored based on the distance between the base station apparatus and the communication terminal apparatus.

Figure 7:
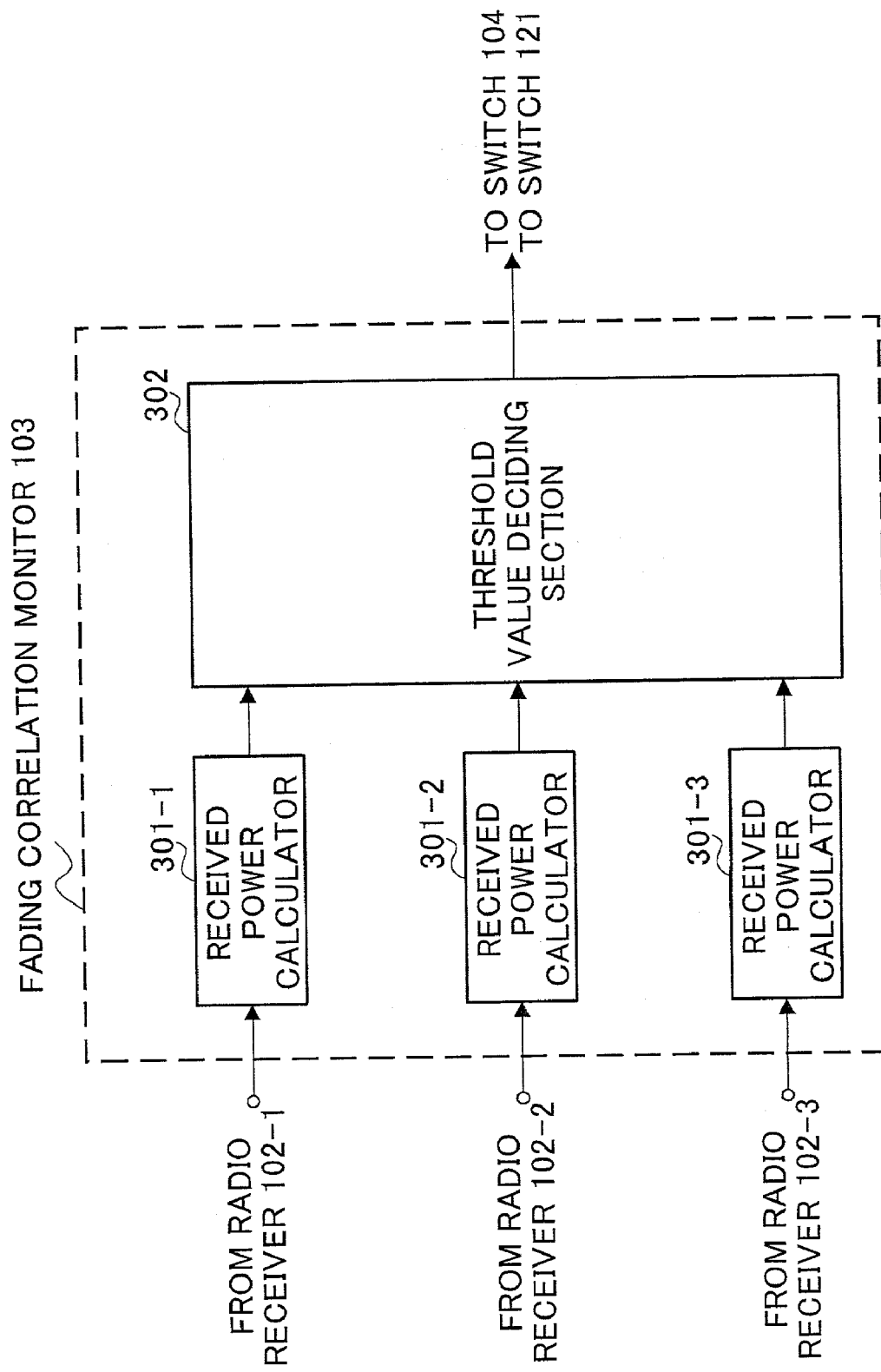
FIG. 7 is a block diagram illustrating the configuration of a fading correlation monitor according to a third embodiment of the present invention.

FIG. 7 is a block diagram illustrating the configuration of a fading correlation monitor 103 according to the third embodiment of the present invention. Referring to FIG. 7, an operational description of the base station apparatus according to the third embodiment is given below. Further, since the structure of the base station apparatus according to the third embodiment excluding the fading correlation monitor 103 is the same as that of the base station apparatus according to first embodiment, detailed description thereof will be omitted.

The received power calculators 301-1 to 301-3 calculate the electric power of the signals received from the corresponding radio receivers 102-1 to 102-3, and outputs the calculated electric power to the threshold value deciding section 302. The threshold value deciding section 302 adds up the received power outputted from the received power calculators 301-1 to 301-3. Then, the added received power is subjected to the threshold value decision process and a switching signal that represents the decision result is outputted to the switch 104 and the switch 121.

Next, an operational description of the base station apparatus 100 configured as described above is given below.

The signals received via antennas 101-1 to 101-3 are subjected to a predetermined radio reception processing in the radio receivers 102-1 to 102-3, and are outputted to the fading correlation monitor 103, the switch 104 and the arrival direction estimator 105. In the fading correlation monitor 103, the calculated received power is subjected to the threshold value decision process and accordingly, a switching signal is generated.

An operational description of the fading correlation monitor 103 is given below.

In the fading correlation monitor 103, the electric power of the received signals of the respective branches is calculated, and the calculated electric power is subjected to the threshold value decision process, then a switching signal is generated, according to the decision result, so as to decide either AAA receiver 106 or diversity receiver 107 is to process the received signal.

First, in the received power calculators 301-1 to 301-3, the electric powers of the received signals of the respective branches outputted from the radio receivers 102-1 to 102-3 are calculated. The calculated received powers are added up in the threshold value deciding section 302, and the addition result is then subjected to the threshold value decision process.

Referring to the fact that the larger the addition result of the received powers of the respective branches is the smaller fading correlation and since the base station apparatus and communication terminal apparatus are close to each other, the threshold value decision process is carried out in order to decide that the received signals should be processed either by the AAA receiver 106 or by the diversity receiver 107 and to decide also that the transmission signal should be processed either by the AAA transmitter 122 or by the diversity transmitter 123. That is to say, when the addition result of the received powers is smaller than a threshold value and hence, the fading correlation is large, it is decided that the AAA receiver 106 processes the received signals and the AAA transmitter 122 processes the transmission signals. While it is decided that the received signals are processed by the diversity receiver 107, and the transmission signals are processed by the diversity transmitter 123 when the addition result of the received power is larger than the threshold value.

Moreover, the switching signal that represents the result of the threshold value decision process is generated and then outputted to the switch 104 and the switch 121. The threshold value is appropriately set in the system taking into account the location of the obstacles that scatters the received radio wave, the algorithm for calculating the weight, etc.

As described above, according to the third embodiment, when the electric power of the received signal is larger than a predetermined threshold value, the interference wave is suppressed by carrying out the AAA transmission and reception, and when the electric power of the received signal is smaller than the predetermined threshold value, the distortion of the signal due to the fading is compensated by carrying out the diversity transmission and reception, and therefore, it is possible to carry out radio communication with a satisfactory communication quality.

Further, in the third embodiment, it is understood that the larger the received power, the closer the distance between the base station apparatus and communication terminal apparatus. Accordingly, when the received power is larger than a predetermined threshold value, the diversity transmission and reception is carried out, and the transmitting power can be suppressed to a lower level. On account of this, the influence of interference on the other stations can be reduced without using any adaptive array antenna.

(Fourth Embodiment)

The base station apparatus according to the fourth embodiment estimates the distance between its own apparatus and the partner communication terminal apparatus based on the time lag of the transmitting timing between the receiving timing of the receive signal and the transmitting timing of the transmission signal. When the estimated distance is larger than a predetermined threshold value, the AAA transmission and reception is carried out to suppress the interference wave while when the estimated distance is smaller than the predetermined threshold value, the diversity transmission and reception is carried out to compensate the distortion of the signals due to the fading. That is to say, the fourth embodiment is different from the third embodiment in the point that the former estimates the distance between the base station apparatus and communication terminal apparatus based on the time lag between the receiving timing of the received signal and the transmitting timing of the transmission signal.

Figure 8:
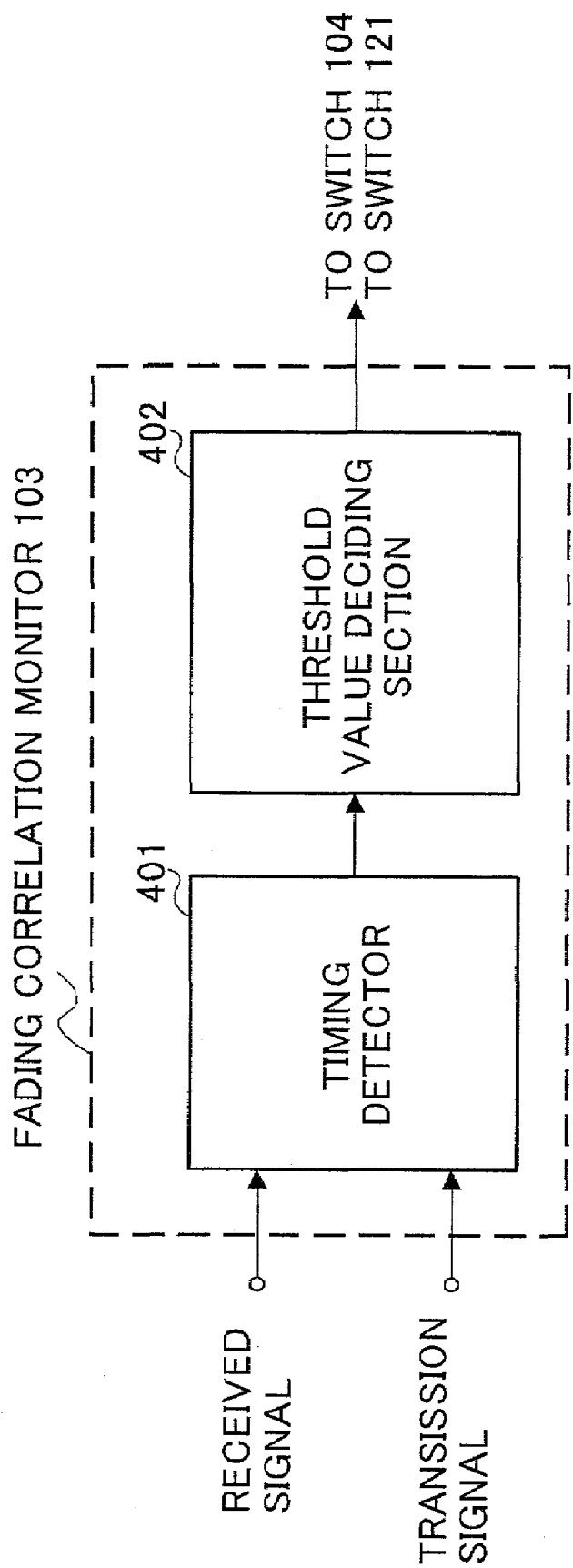
FIG. 8 is a block diagram illustrating the configuration of a fading correlation monitor according to a fourth embodiment of the present invention.

FIG. 8 is a block diagram illustrating the configuration of a fading correlation monitor 103 according to the fourth embodiment. Referring to FIG. 8, an operational description of the base station apparatus according to the fourth embodiment is given. Furthermore, since the structure of the base station apparatus according to the fourth embodiment excluding the fading correlation monitor 103 is the same as the base station apparatus of the first embodiment, detailed description thereof will be omitted.

The timing detector 401 detects the time difference between the input time of the received signal and the input time of the transmission signal, and outputs the detected time difference to the threshold value deciding section 402. The threshold value deciding section 402 carries out threshold value decision process on the time difference outputted from the timing detector 401, and then outputs a switching signal which represents the decision result to the switch 104 and the switch 121.

Now, an operational description of the base station apparatus 100 configured as described above is given.

The signals received via antennas 101-1 to 101-3 are subjected to the predetermined radio reception processing in the radio receivers 102-1 to 102-3, and outputted to the fading correlation monitor 103, the switch 104 and the arrival directivity estimator 105. In the fading correlation monitor 103, the calculated received power is subjected to the threshold value decision process to generate the switching signal.

Now, an operational description of the fading correlation monitor 103 is given.

In the fading correlation monitor 103, the electric powers of the received signals of the respective branches are calculated, the calculated electric powers are subjected to the threshold value decision process, and the switching signal which decides that the received signals should be processed by either the AAA receiver 106 or the diversity receiver 107 is generated according to the decision result.

First, in the timing detector 401, the time difference between the input time of the received signal and the input time of the transmission signal is detected.

The detected time difference is subjected to the threshold value decision process in the threshold value deciding section 402. Referring to the fact that the larger the time difference between the received signal and the transmission signal is, the longer distance between the base station apparatus and communication terminal apparatus and hence, a smaller fading correlation, the threshold value decision process is carried out to decide that the received signals should be processed either by the AAA receiver 106 or the diversity receiver 107 and to decide also that the transmission signals should be processed either by the AAA transmitter 122 or the diversity transmitter 123. That is to say, when the time difference is larger than the threshold value and hence, the fading correlation is large, it is decided that the received signals are processed by the AAA receiver 106 and the transmission signals are processed by the AAA transmitter 122. While it is decided that the received signals are processed by the diversity receiver 107 and the transmission signals are processed by the diversity transmitter 123 when the time difference is smaller than the threshold value.

The switching signal that represents the result of the threshold value decision process is generated and outputted to the switch 104 and the switch 121. The threshold value is appropriately set in the system taking into account the location of the obstacles that scatters the received radio wave, the algorithm for calculating the weight, etc.

As described above, according to the present embodiment, when the time difference is larger than a predetermined threshold value, the interference wave is suppressed by carrying out the AAA transmission and reception, and when the electric power of the received signal is smaller than a predetermined threshold value, the distortion of the signal due to the fading is compensated by carrying out the diversity transmission and reception, and hence, it is possible to carry out a radio communication with a satisfactory communication quality.

Further, in the fourth embodiment, it is understood that the smaller the time difference is the smaller distance between the base station apparatus and communication terminal apparatus. Accordingly, when the time difference is smaller than a predetermined threshold value, the diversity transmission and reception is carried out, and the transmitting power can be reduced to a lower level. On the account of this, the interference that influences other stations can be reduced without using any adaptive array antenna.

(Fifth Embodiment)

The base station apparatus according to a fifth embodiment estimates the distance between its own apparatus and the partner communication terminal apparatus based on the TPC-bits information used for up/down conversion of the transmission power in transmission power controlling process. When the estimated distance is larger than a predetermined threshold value, the AAA transmission and reception is carried out to suppress the interference wave, and when the estimated distance is smaller than the predetermined threshold value, the diversity transmission and reception is carried out to compensate the distortion of the signals due to the fading. That is to say, the fifth embodiment is different from the third embodiment in the point that the former estimates the distance between the base station apparatus and communication terminal apparatus based on the TPC-bits.

Figure 9:
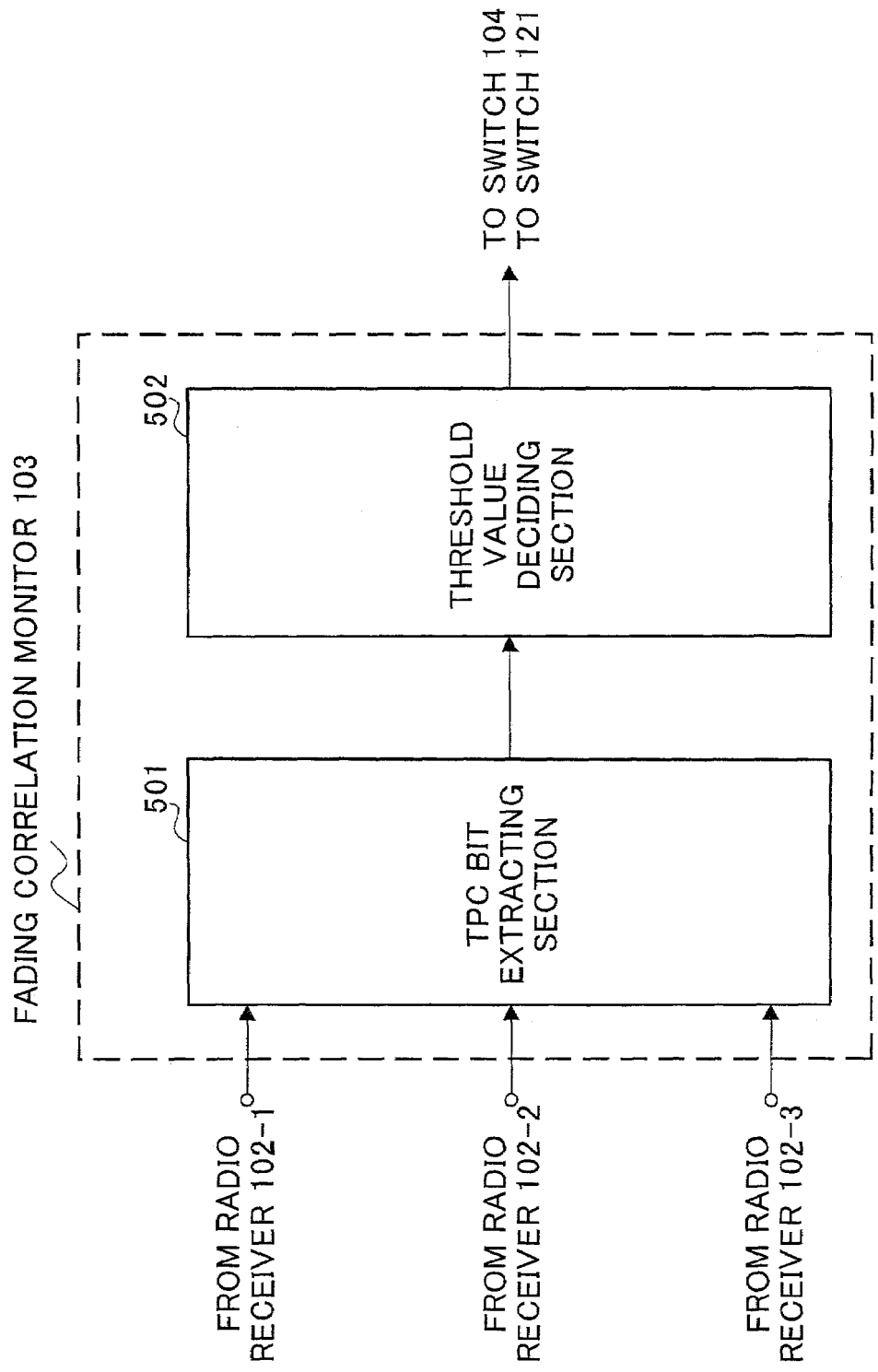
FIG. 9 is a block diagram illustrating the configuration of a fading correlation monitor according to a fifth embodiment of the present invention.

FIG. 9 is a block diagram illustrating the configuration of a fading correlation monitor 103 according to the fifth embodiment. Referring to the FIG. 9, an operational description of a base station apparatus according to the fifth embodiment is given below. Further, since the structure of the base station apparatus according to the fifth embodiment excluding the fading correlation monitor 103 is the same as the base station apparatus of the first embodiment, detailed description thereof will be omitted.

The TPC bit extracting section 501 extracts the TPC bits included in the received signals and outputs the extracted TPC-bits to the threshold value deciding section 502. In the threshold value deciding section 502, the number of the bits used for raising up the transmitting power (hereinafter, referred to as "up-information bits") is counted out of the total TPC bits output from the TPC bit extracting section 501, the number of the counted up-information bits is subjected to the threshold value deciding process, and a switching signal that represents the threshold value is outputted to the switch 104 and the switch 121.

Next, an operational description of the base station apparatus 100 configured as described above is given.

The signals received via antennas 101-1 to 101-3 are subjected to the predetermined radio reception processing in the radio receivers 102-1 to 102-3, and outputted to the fading correlation monitor 103, the switch 104 and the arrival direction estimator 105. In the fading correlation monitor 103, the calculated received powers are subjected to the threshold value deciding process to generate the switching signal.

An operational description of the fading correlation monitor 103 is given below.

In the fading correlation monitor 103, the electric powers of the received signals of the respective branches are calculated, the calculated electric powers are subjected to the threshold value decision process, and the switching signal which decides that the received signals should be processed either by the AAA receiver 106 or the diversity receiver 107 is generated according to the decision result.

First, in the TPC bit extracting section 501, TPC bits are extracted from the received signals, then the extracted TPC bits are outputted to the threshold value deciding section 502.

In the threshold value deciding section 502, the number of the bits that indicate the raising up of the transmitting power (up-information bits) are counted out of the total TPC bits outputted from the TPC bit extracting section 501, and the counted bit number is subjected to the threshold value decision process. While considering the fact that the larger number of the up-information bits is the worse condition of the propagation path, and hence, a smaller fading correlation, the threshold value decision process is carried out in order to decide that the received signals should be processed by either the AAA receiver 106 or the diversity receiver 107 and to decide also that the transmission signals should be processed by either the AAA transmitter 122 or the diversity transmitter 123. That is to say, when the number of the up-information bits is smaller than the threshold value, and hence the fading correlation is large, it is decided that the received signals are processed by the AAA receiver 106 and the transmission signals are processed by the AAA transmitter 122. On the contrary, when the up instruction bits is larger than the threshold value, then, it is decided that the received signals are processed by the diversity receiver 107 and the transmission signals are processed by the diversity transmitter 123.

The switching signal that represents the result of the threshold value decision process is generated and outputted to the switch 104 and the switch 121. The threshold value is appropriately set in the system taking into account the location of the obstacles that scatters the received radio wave, the algorithm for calculating the weight, etc.

Thus, according to the fifth embodiment, when the number of the up-information bits is larger than a predetermined threshold value, the interference wave is suppressed by carrying out the AAA transmission and reception, while when the electric power of the received signal is smaller than the predetermined threshold value, the distortion of the signal due to the fading is compensated by carrying out the diversity transmission and reception, and therefore, it is possible to carry out a radio communication with a satisfactory communication quality.

Further, in the fifth embodiment, since the larger number of the up-information bits is the worse propagation path environment, it is understood that the mobile station is located in a faraway position from the base station. Accordingly, when the number of the up-information bits is larger than a predetermined threshold value, the diversity transmission and reception is carried out, and the transmitting power can be reduced to a lower level. On account of this, the interference that influences other stations can be reduced without using any adaptive array antenna.

Furthermore, in the respective embodiments described above, the case in which the maximal-ratio combining diversity transmission is carried out has been mainly described as a method of the diversity transmission, however, it is needless to say that other methods of diversity transmission are also applicable. For example, satisfactory transmission characteristics can be achieved when a selective transmission or a closed loop type diversity transmission is adopted.

As demonstrated in the foregoing descriptions, according to the present invention, radio communication with a satisfactory communication quality can be carried out even when the correlation of the fading is small by monitoring the fading correlation, then by switching over the AAA transmission/reception and the diversity transmission/reception according to the monitoring result.

This application is based on the Japanese Patent Application No. 2000-197133 filed on Jun. 29, 2000. The entire content thereof is incorporated herein.

INDUSTRIAL APPLICABILITY

The present invention is preferably applicable to both a radio base station apparatus and a radio communication method which carry out directional transmission and reception.

The invention claimed is:

1. A radio base station apparatus comprising:
a fading correlation monitor that detects a fading correlation of radio waves received through a plurality of antenna elements;
a reception method selector that receives the radio waves from the antenna elements and provides the radio waves to a receiver selected in accordance with the detected fading correlation;
a directional receiver that executes directional reception, on the provided radio waves, only when the reception method selector selects the directional receiver to receive the provided radio waves;
a diversity receiver that executes diversity reception, on the provided radio waves, only when the reception method selector selects the diversity receiver to receive the provided radio waves; and
a demodulator that demodulates a signal output by the receiver selected to receive the radio waves provided by the reception method selector, wherein:
the directional receiver creates directivity for the radio waves to increase the quality of the demodulated signal, and
the diversity receiver combines or selects a plurality of signal sequences within the radio waves to increase the quality of the demodulated signal.

2. The radio base station apparatus of claim 1 wherein the reception method selector selects the directional receiver to receive the provided radio waves when the detected fading correlation is greater than a predetermined threshold value and selects the diversity receiver to receive the provided radio waves when the fading correlation is less than or equal to the predetermined threshold value.

3. The radio base station apparatus of claim 1, further comprising:
a transmission method selector that receives a modulated signal and provides the modulated signal to a transmitter selected in accordance with the detected fading correlation;
a directional transmitter that executes directional transmission, on the provided modulated signal, through the antenna elements only when the transmission method selector selects the directional transmitter to transmit the provided modulated signal;
a diversity transmitter that executes diversity transmission, on the provided modulated signal, through the antenna elements only when the transmission method selector selects the diversity transmitter to transmit the provided modulated signal, wherein:
the directional transmitter creates directivity for the provided modulated signal using the antenna elements, and
the diversity transmitter combines or selects for transmission a plurality of signal sequences within the provided modulated signal.

4. The radio base station apparatus of claim 3, wherein the transmission method selector selects the directional transmitter to transmit the provided modulated signal when the fading correlation is greater than a predetermined threshold value and selects the diversity transmitter to transmit the provided modulated signal when the fading correlation is less than or equal to the predetermined threshold value.

5. The radio base station apparatus of claim 3, wherein, the diversity transmitter transmits at a lower transmission power than the directional transmitter.

6. The radio base station apparatus of claim 1, wherein the fading correlation monitor estimates an angle spread of a signal received from a communicating party and detects the fading correlation with reference to the estimated angle spread.

7. The radio base station apparatus of claim 1, wherein the fading correlation monitor calculates a fading correlation value and detects the fading correlation with reference to the calculated fading correlation value.

8. A radio communication method comprising:
detecting a fading correlation of radio waves received through a plurality of antenna elements;
providing the received radio waves to a receiver selected in accordance with the detected fading correlation;
executing directional reception, on the provided radio waves, with a directional receiver only when the directional receiver is selected to receive the provided radio waves;
executing diversity reception, on the provided radio waves, with a diversity receiver only when the diversity receiver is selected to receive the provided radio waves; and demodulating a signal output by the receiver selected to receive the provided radio waves, wherein:

executing directional reception creates directivity for the provided radio waves to increase the quality of the demodulated signal, and executing diversity reception combines or selects a plurality of signal sequences within the provided radio waves to increase the quality of the demodulated signal.

9. The radio communication method of claim 8, further comprising:

providing a modulated signal to a transmitter selected in accordance with the detected fading correlation;

executing directional transmission, for the provided modulated signal, through the antenna elements with a directional transmitter only when the directional transmitter is selected to transmit the provided modulated signal;

executing diversity transmission, for the provided modulated signal, through the antenna elements with a diversity transmitter only when the diversity transmitter is selected to transmit the provided modulated signal, wherein:

the directional transmitter creates directivity for the provided modulated signal using the antenna elements, and the diversity transmitter combines or selects for transmission a plurality of signal sequences within the provided modulated signal.

* * * * *